(12) United States Patent
Rubin et al.

(10) Patent No.: US 7,496,829 B2
(45) Date of Patent: *Feb. 24, 2009

(54) METHOD AND APPARATUS FOR DISPLAYING MULTIPLE CONTEXTS IN ELECTRONIC DOCUMENTS

(75) Inventors: Darryl E. Rubin, Redmond, WA (US);
Jonathan C. Cluts, Redmond, WA (US);
Susan D. Woolf, Seattle, WA (US); John L. Beezer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 110 days.

This patent is subject to a terminal disclaimer.

(21) Appl. No.: 10/940,729

(22) Filed: Sep. 15, 2004

(65) Prior Publication Data

US 2005/0034056 A1 Feb. 10, 2005

Related U.S. Application Data

(63) Continuation of application No. 09/556,865, filed on Apr. 21, 2000, now Pat. No. 7,243,299.

(51) Int. Cl.
*G06F 17/30* (2006.01)

(52) U.S. Cl. ............ 715/203; 715/243; 715/731; 715/788; 715/803; 715/209

(58) Field of Classification Search .......... 715/501.1, 715/517, 788, 790, 796, 203, 243, 209, 731, 715/803
See application file for complete search history.

(56) References Cited

U.S. PATENT DOCUMENTS 5,146,552 A 9/1992 Cassorla et al.

(Continued)

FOREIGN PATENT DOCUMENTS

EP 0342838 A 11/1989

(Continued)

OTHER PUBLICATIONS

Schilit et al., "Digital Library Information Appliances", pp. 217-225, 1998.

(Continued)

*Primary Examiner*—Stephen S Hong
*Assistant Examiner*—Matthew J Ludwig
(74) *Attorney, Agent, or Firm*—Birch, Stewart, Kolasch & Birch, LLP

(57) ABSTRACT

Methods and apparatus for simultaneously displaying multiple-contexts in a page-oriented viewing architecture utilize the concept of page pinning in which a portion of a first document context is displayed as a fixed frame overlayed on or placed beside the display of a second document context. A user may navigate within the second document context while viewing the portion of the first document context as a pinned page on the display. Thus, a single navigational focus is maintained even though multiple contexts are displayed in the page-oriented architecture. Page pinning may be used to view two non-contiguous locations in a single electronic document or to view two pages of respective different electronic documents. A pinned page can be used to hold a particular context while a command set is executed from a command document viewed as the second context. A pinned index page can used to provide a collection of links for permitting a user to navigate to different contexts, including pages within a main document or to other documents. Finally a pinned page can be used to provide the equivalent of an "always on top window" display.

34 Claims, 13 Drawing Sheets

U.S. PATENT DOCUMENTS

| | | |
|---|---|---|
| 5,237,648 A | 8/1993 | Mills et al. |
| 5,239,466 A | 8/1993 | Morgan et al. |
| RE34,476 E | 12/1993 | Norwood |
| 5,347,295 A | 9/1994 | Agulnick et al. |
| 5,390,138 A | 2/1995 | Milne et al. |
| 5,434,929 A | 7/1995 | Beernink et al. |
| 5,434,965 A | 7/1995 | Matheny |
| 5,471,568 A | 11/1995 | Webb et al. |
| 5,559,942 A | 9/1996 | Gough et al. |
| 5,572,643 A | 11/1996 | Judson |
| 5,623,679 A | 4/1997 | Rivette et al. |
| 5,625,833 A | 4/1997 | Levine et al. |
| 5,630,125 A | 5/1997 | Zellweger |
| 5,632,022 A | 5/1997 | Warren et al. |
| 5,644,674 A | 7/1997 | Aihara et al. |
| 5,666,113 A | 9/1997 | Logan |
| 5,680,636 A | 10/1997 | Levine et al. |
| 5,682,439 A | 10/1997 | Beernink et al. |
| 5,687,331 A | 11/1997 | Volk et al. |
| 5,689,717 A | 11/1997 | Pritt |
| 5,717,860 A | 2/1998 | Graber et al. |
| 5,717,879 A | 2/1998 | Moran |
| 5,719,595 A | 2/1998 | Hoddie et al. |
| 5,727,129 A | 3/1998 | Barrett et al. |
| 5,729,687 A | 3/1998 | Rothrock et al. |
| 5,737,599 A | 4/1998 | Rowe et al. |
| 5,745,116 A | 4/1998 | Pisutha-Amond |
| 5,760,773 A | 6/1998 | Berman et al. |
| 5,761,485 A | 6/1998 | Munyan |
| 5,761,683 A | 6/1998 | Logan et al. |
| 5,784,058 A | 7/1998 | LaStrange et al. |
| 5,786,814 A | 7/1998 | Moran et al. |
| 5,790,818 A | 8/1998 | Martin |
| 5,801,685 A | 9/1998 | Miller et al. |
| 5,801,687 A | 9/1998 | Peterson et al. |
| 5,802,516 A | 9/1998 | Shwarts et al. |
| 5,819,301 A | 10/1998 | Rowe et al. |
| 5,821,925 A | 10/1998 | Carey et al. |
| 5,822,720 A | 10/1998 | Bookman et al. |
| 5,826,025 A | 10/1998 | Gramlich |
| 5,832,263 A | 11/1998 | Hansen et al. |
| 5,835,092 A | 11/1998 | Boudreau et al. |
| 5,838,313 A | 11/1998 | Hou et al. |
| 5,838,914 A | 11/1998 | Carleton et al. |
| 5,845,262 A | 12/1998 | Nozue et al. |
| 5,854,630 A | 12/1998 | Nielsen |
| 5,860,074 A | 1/1999 | Rowe et al. |
| 5,862,395 A | 1/1999 | Bier |
| 5,877,757 A | 3/1999 | Baldwin et al. |
| 5,893,126 A | 4/1999 | Drews et al. |
| 5,893,132 A | 4/1999 | Huffman et al. |
| 5,918,236 A | 6/1999 | Wical |
| 5,920,694 A | 7/1999 | Carleton et al. |
| 5,923,326 A | 7/1999 | Bittinger et al. |
| 5,924,104 A | 7/1999 | Earl |
| 5,931,912 A | 8/1999 | Wu et al. |
| 5,933,139 A | 8/1999 | Feigner et al. |
| 5,933,140 A | 8/1999 | Strahorn et al. |
| 5,937,416 A | 8/1999 | Menzel |
| 5,940,080 A | 8/1999 | Ruehle et al. |
| 5,948,040 A | 9/1999 | DeLorme et al. |
| 5,950,214 A | 9/1999 | Rivette et al. |
| 5,956,034 A | 9/1999 | Sachs et al. |
| 5,956,048 A | 9/1999 | Gatson |
| 5,978,818 A | 11/1999 | Lin |
| 5,982,370 A | 11/1999 | Kamper |
| 5,983,248 A | 11/1999 | DeRose et al. |
| 5,986,665 A | 11/1999 | Wrey et al. |
| 6,011,537 A | 1/2000 | Slotznick |
| 6,012,055 A | 1/2000 | Campbell et al. |
| 6,018,334 A | 1/2000 | Eckerberg et al. |
| 6,018,342 A | 1/2000 | Bristor |
| 6,018,344 A | 1/2000 | Harada et al. |
| 6,018,742 A | 1/2000 | Herbert, III |
| 6,025,841 A | 2/2000 | Finkelstein et al. |
| 6,034,689 A | 3/2000 | White et al. |
| 6,035,330 A | 3/2000 | Astiz et al. |
| 6,037,934 A | 3/2000 | Himmel et al. |
| 6,038,598 A | 3/2000 | Danneels |
| 6,049,812 A | 4/2000 | Bertram et al. |
| 6,052,514 A | 4/2000 | Gill et al. |
| 6,054,990 A | 4/2000 | Tran |
| 6,055,538 A | 4/2000 | Kessenich et al. |
| 6,064,384 A | 5/2000 | Ho |
| 6,072,490 A | 6/2000 | Bates et al. |
| 6,076,917 A | 6/2000 | Wen |
| 6,081,829 A | 6/2000 | Sidana |
| 6,091,930 A | 7/2000 | Mortimer et al. |
| 6,094,197 A | 7/2000 | Buxton et al. |
| 6,105,044 A | 8/2000 | DeRose et al. |
| 6,122,649 A | 9/2000 | Kanerva et al. |
| 6,133,925 A | 10/2000 | Jaremko et al. |
| 6,141,007 A | 10/2000 | Lebling et al. |
| 6,144,375 A | 11/2000 | Jain et al. |
| 6,144,991 A | 11/2000 | England |
| 6,151,622 A | 11/2000 | Fraenkel et al. |
| 6,154,771 A | 11/2000 | Rangan et al. |
| 6,157,381 A | 12/2000 | Bates et al. |
| 6,163,778 A | 12/2000 | Fogg et al. |
| 6,181,344 B1 | 1/2001 | Tarpenning et al. |
| 6,184,886 B1 | 2/2001 | Bates et al. |
| 6,195,679 B1 | 2/2001 | Bauersfeld et al. |
| 6,195,694 B1 | 2/2001 | Chen et al. |
| 6,199,082 B1 | 3/2001 | Ferrel et al. |
| 6,205,419 B1 | 3/2001 | Fielder |
| 6,205,455 B1 | 3/2001 | Umen et al. |
| 6,211,871 B1 | 4/2001 | Himmel et al. |
| 6,226,655 B1 | 5/2001 | Borman et al. |
| 6,230,171 B1 | 5/2001 | Pacifici et al. |
| 6,243,071 B1 | 6/2001 | Shwarts et al. |
| 6,243,091 B1 | 6/2001 | Berstis |
| 6,266,772 B1 | 7/2001 | Suzuki |
| 6,271,840 B1 | 8/2001 | Finseth et al. |
| 6,272,484 B1 | 8/2001 | Martin et al. |
| 6,279,005 B1 | 8/2001 | Zellweger |
| 6,279,014 B1 | 8/2001 | Schilit et al. |
| 6,289,126 B1 | 9/2001 | Ishisaka |
| 6,289,362 B1 | 9/2001 | Van Der Meer |
| 6,301,590 B1 | 10/2001 | Siow et al. |
| 6,320,169 B1 | 11/2001 | Clothier |
| 6,320,577 B1 | 11/2001 | Alexander |
| 6,321,244 B1 | 11/2001 | Liu et al. |
| 6,331,866 B1 | 12/2001 | Eisenberg |
| 6,331,867 B1 | 12/2001 | Eberhard |
| 6,340,980 B1 | 1/2002 | Ho |
| 6,356,287 B1 | 3/2002 | Ruberry et al. |
| 6,369,811 B1 | 4/2002 | Graham et al. |
| 6,370,497 B1 | 4/2002 | Knowles |
| 6,377,983 B1 | 4/2002 | Cohen et al. |
| 6,389,434 B1 | 5/2002 | Rivette et al. |
| 6,393,422 B1 | 5/2002 | Wone |
| 6,397,264 B1 | 5/2002 | Stasnick et al. |
| 6,405,221 B1 | 6/2002 | Levine et al. |
| 6,418,421 B1 | 7/2002 | Hurtado et al. |
| 6,421,065 B1 | 7/2002 | Walden et al. |
| 6,425,525 B1 | 7/2002 | Swaminathan et al. |
| 6,437,793 B1 | 8/2002 | Kaasila |
| 6,437,807 B1 | 8/2002 | Berquist et al. |
| 6,446,110 B1 | 9/2002 | Lection et al. |
| 6,457,013 B1 | 9/2002 | Saxton et al. |
| 6,460,058 B2 | 10/2002 | Koppolu et al. |
| 6,484,156 B1 | 11/2002 | Gupta et al. |
| 6,486,895 B1 | 11/2002 | Robertson et al. |
| 6,490,603 B1 | 12/2002 | Keenan et al. |

| | | |
|---|---|---|
| 6,529,920 B1 | 3/2003 | Arons et al. |
| 6,535,294 B1 | 3/2003 | Arledge et al. |
| 6,539,370 B1 | 3/2003 | Chang et al. |
| 6,549,220 B1 | 4/2003 | Hsu et al. |
| 6,549,878 B1 | 4/2003 | Lowry et al. |
| 6,560,621 B2 | 5/2003 | Barile |
| 6,571,211 B1 | 5/2003 | Dwyer et al. |
| 6,571,295 B1 | 5/2003 | Sidana |
| 6,573,907 B1 | 6/2003 | Madrane |
| 6,585,776 B1 | 7/2003 | Bates et al. |
| 6,631,496 B1 | 10/2003 | Li et al. |
| 6,636,238 B1 | 10/2003 | Amir et al. |
| 6,647,534 B1 | 11/2003 | Graham et al. |
| 6,662,310 B2 | 12/2003 | Lopez et al. |
| 6,687,878 B1 | 2/2004 | Eintracht et al. |
| 6,697,997 B1 | 2/2004 | Fujimura |
| 6,710,790 B1 | 3/2004 | Fagioli |
| 6,714,214 B1 | 3/2004 | DeMello |
| 6,760,884 B1 | 7/2004 | Vertelney et al. |
| 6,772,139 B1 | 8/2004 | Smith |
| 6,788,316 B1 | 9/2004 | Ma et al. |
| 6,871,318 B1 | 3/2005 | Wynblatt et al. |
| 6,904,450 B1 | 6/2005 | King et al. |
| 7,210,093 B1 * | 4/2007 | Dutta ..................... 715/501.1 |
| 2001/0031128 A1 | 10/2001 | Manbeck |
| 2002/0097261 A1 | 7/2002 | Gottfurcht et al. |
| 2002/0099552 A1 | 7/2002 | Rubin et al. |
| 2002/0194260 A1 | 12/2002 | Headley et al. |
| 2005/0060138 A1 | 3/2005 | Wang et al. |

FOREIGN PATENT DOCUMENTS

| | | |
|---|---|---|
| EP | 0 822 501 A1 | 2/1998 |
| EP | 0 890 926 A1 | 1/1999 |
| EP | 0902379 A2 | 3/1999 |
| WO | WO 87/01481 | 3/1987 |
| WO | WO 96/20908 | 7/1996 |
| WO | WO 97/22109 | 6/1997 |
| WO | WO 98/06054 | 2/1998 |
| WO | WO 98/09446 | 3/1998 |
| WO | WO 99/49383 | 9/1999 |

OTHER PUBLICATIONS

Graefe et al., "Designing the muse: A Digital Music Stand for the Symphony Musician", pp. 436-440, CHI 96, Apr. 13-18, 1996.
"Adobe Acrobat 3.0 Reader Online Guide", Adobe Systems, Inc., 1996, pp. 1-110.
SoftBook.RTM.Press. The Leader In Internet-Enabled Document Distribution and Reading Systems; http://www.softbook.com/consumer/reader.asp.
Rocket eBook Using the Rocket eBook: http://www.rocketbook.com/Products/Faq/using.html.
Explore the Features of the Rocket eBook; wysiwyg//212http://www.rocketbook.com/Products.Tourindex.html.
Crespo, Chang, and Bier, "Responsive Interaction for a large Web application: the meteror shower architecture in the WebWriter II Editor", Computer Networks and ISON Systems, pp. 1508-1517.
Kunikazu, T., Patent Abstracts of Japan, Publication No. 11327789 for Color Display and Electronic Blackboard System, published Nov. 30, 1999.
Open eBook Forum. Open eBookTM Publication Structure 1.0, http://www.ebook.org/oebos/oebost.p/download/oeb1-oebps.htm.
Kristensen, A., "Formsheets and the XML Forms Language" (Mar. 1999).
Dublin Core Resource Types: Structurally Draft; Jul. 24, 1997, Feb. 27, 1998.
Dublin Core Meladate Element Set. Version 1.1:Reference Description 1999.
Dublin Core Metadate Initiative: User Guide Working Draft 1998—Jul. 31, 1999.
Hirotsu et al., "Cmew/U—A Multimedia Web Annotation Sharing System", NTT Network Innovation Laboratories—Japan, IEEE, 1999, pp. 356-359.
Kuo et al., "A Synchronization Scheme for Multimedia Annotation"Multimedia Information Networking Laboratory, Tamkang University—Taiwan, IEEE, 1997, pp. 594-598.
"Hucklefine Defined," Apr. 1990, http://www.ylem.org/artists/mmosher/huck.html, pp. 1-3.
"Tour of Korea Hypcercard Stack," 1996, Grose Educational Media, http://www.entrenet.com/~groedmed/kor2.html, pp. 1-2.
Bizweb2000.com—screenshots of an e-book, published on May 1999, pp. 1-4, http://web.archive.org/web/*/http://www.bizweb2000.com/eshots.htm.
Greenberg, Saul, "A Fisheye Text Editor for Relaxed-WYSIWIS Groupware", Chi 1996 Proceedings, pp. 1 to 5.
Marshall, C., "Annotation from paper books to the digital library," ACM International Conf. on Digital Libraries, 1997, pp. 131-140.
"Joke eBook," Jul. 1998, PrimaSoft PC, Inc., Electronic Book Series Version 1.0, pp. 1-5.
Munyan, D., "Everybook, Inc: Developing the E-Book in Relation to Publishing Standards," Sep. 1998, http://www.futureprint.kent.edu/articles/munyan01.htm, pp. 1-7.
C. Marshall, "Annotation from paper books to the digital library," ACM International Conf. on Digital Libraries, 1997, pp. 131-140.
D. Munyan, "Everybook, Inc: Developing the E-Book in Relation to Publishing Standards." Sep. 1998, http://www.futureprint.kent.edu/articles/munyan0.1htm, pp. 1-7.
PhotoImpact 3.0, Ulead Systems Inc., 1996.
Landay et al., "Making Sharing Pervasive: Ubiquitous Computing for Shared Note Taking," IBM Systems Journal, vol. 38, No 4, 1999, pp. 531-550.
Landay, J. A., "Using Note-Taking Appliances for Student to Student Collaboration," 29th Annual Frontiers in Education Conference, IEEE Computer Society, Nov. 1999, p. Session 12C4/15-12C4/20.
Adobe Acrobat 3.0 Review, downloaded from <http://www.hmug.org/Reviews/>, reviewed Mar. 1997, pp. 1-18.

* cited by examiner

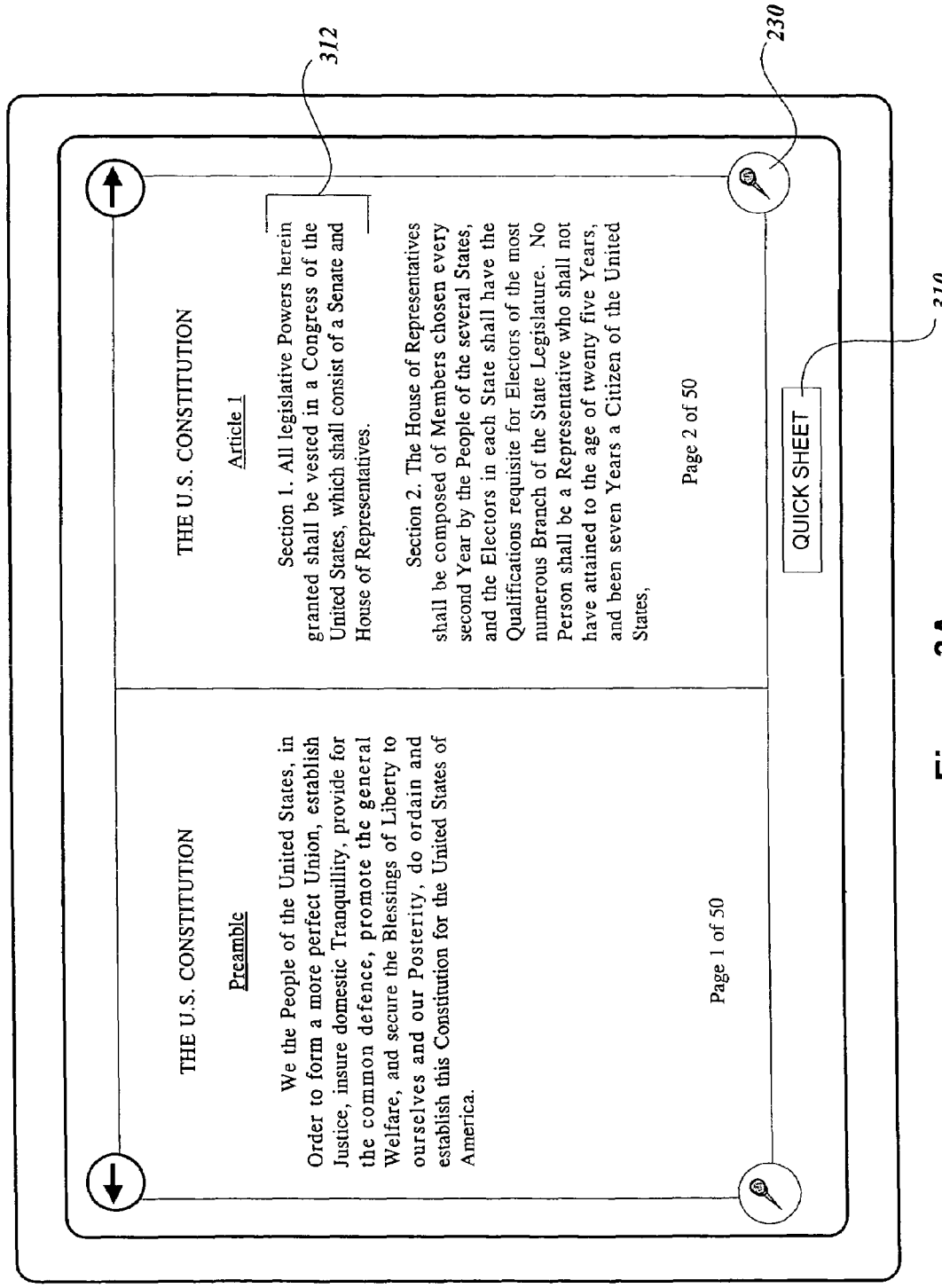

|  | Display | Navigation History |
|---|---|---|
| Figure 10A | 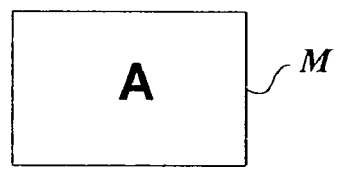 | A |
| Figure 10B | 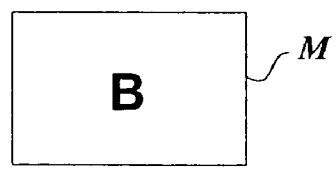 | A → B |
| Figure 10C | 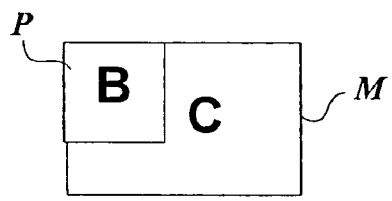 | A → B → C |
| Figure 10D | 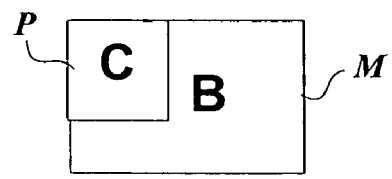 | A → B → C |
| Figure 10E | 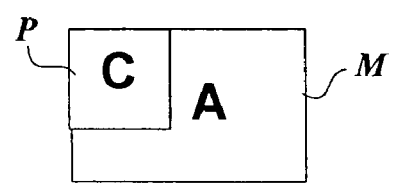 | A → B → C |

METHOD AND APPARATUS FOR DISPLAYING MULTIPLE CONTEXTS IN ELECTRONIC DOCUMENTS

CROSS REFERENCE TO RELATED APPLICATIONS

This application is a continuation of prior U.S. application Ser. No. 09/556,865, filed Apr. 21, 2000, the entire contents of which is incorporated herein by reference.

TECHNICAL FIELD

The invention relates to methods and apparatus for displaying electronic documents. More particularly, the invention relates to methods and apparatus for displaying multiple contexts in electronic documents.

BACKGROUND OF THE INVENTION

With the proliferation of portable hand-held electronic devices, such as personal digital assistants (PDA's) and other personal electronic devices, there has been considerable effort invested in the simplification of a user's experience in viewing electronic content. Generally, a primary goal of such efforts has been to provide systems for presenting information to a user in a manner that is intuitively simple, yet which provides for efficient access to and navigation of electronic documents.

Known multiple-window architectures have limited appeal to those attempting to provide an intuitively simple system for presenting information to a user. While such architectures permit a user to display multiple contexts of electronic documents, they complicate the user's experience of electronic content. For example, the many menus, toolbars, scroll bars and command dialogues associated with known multiple-window architectures detract from the user's ability to maintain an understanding of which content is the current focus of the system. That is, multiple-window architectures provide a multi-space navigational environment in which each display context is provided with its own set of navigational controls and therefore, these architectures lack the simplicity maintained by a single navigational focus. In a user interface without a single navigational focus, there may be a multiplicity of navigational controls on the screen, some which affect one frame, some which affect another, and possibly some that effect navigation between different of the frames. Because each frame needs its own navigational controls, many identical controls are duplicated and different frames may implement similar navigational features in different ways, or implement features in one frame that are not available in others, all depending on which application is running in each frame. This creates both clutter as well as conceptual difficulty for users. Thus, it is difficult for a user to maintain a clear understanding of which of a number of navigational environments displayed is the currently active one. This complicates the user's experience and often results in unnecessary duplication of sets of navigational controls.

In contrast to multiple-window architectures, page-oriented architectures offer simplicity derived from the maintenance of a single navigational focus at all times. These architectures treat all electronic content as a document that can be paged through sequentially. Thus, the navigational focus is always very apparent to the user. Today's web browsers exhibit qualities of page-oriented architectures insofar as web pages are viewed individually in series as the user navigates to different electronic document pages. Because they mimic the navigational paradigm of a printed book and provide no confusion as to the current navigational focus, page-oriented architectures provide users with a very familiar and simple system for navigating electronic documents.

One drawback of strict page-oriented architectures, however, is that they do not permit the simultaneous viewing of multiple contexts of electronic documents. Multiple contexts would include, for example, non-contiguous pages of a single electronic document, or pages of two different electronic documents. To illustrate this drawback of strict page-oriented architectures, today's browsers do not permit simultaneous viewing of multiple contexts without resort to a multi-tasking, multiple-window environment in which more than one instance of the browser can be executed. Resort to multiple-window environments, however, results in a loss of the benefits of the single navigational focus of the page-oriented architecture.

It would therefore be desirable to provide apparatus and methods for displaying electronic documents that permits the simultaneous viewing of multiple contexts of electronic documents, while maintaining only a single navigational focus. It would also be desirable to provide apparatus and methods for displaying electronic documents which eliminates the complexity inherent in prior art systems that provide a navigational focus for each of the multiple contexts being displayed to the user.

Another drawback of multiple-window architectures is that such architectures do not always provide for the creation of a single navigational history. Each window maintains either its own navigational history, or else no history (this depends on the application). Furthermore, the features and user interface for accessing and navigating history differs among applications. For example, if the user runs two instances of a browser, each window has its own back/forward history chain. If a user had visited documents 1, 2, and 3 in Window A and 4, 5, and 6 in Window B, there would be no way to use the back/forward buttons in Window A to get to document 4, 5, or 6, because 4, 5, and 6 are not in its navigation history. To allow access to documents not in history, some browsers provide an address bar where document addresses can be entered, and a search command that can locate certain categories of documents (web pages).

Known applications provide other kinds of navigational facilities. One is a short list of recently used documents that are kept under a "File" menu. Another is the list of documents currently opened by that application, which is kept under a "Window" menu. Both the File and the Window menu can thus be used in lieu of forward/back buttons to navigate among recently viewed documents. And of course, the lists of documents under these menus in different applications will be different, depending on which documents the user has recently opened within each window. Some applications also provide a File Open command where the names of documents can be entered; this is analogous to but different from the browser address bar.

Thus, given a display of multiple windows, with the focus on one current window, should the user wish to display a recently visited document, they must remember which window it had been opened in and put the focus on that window before they attempt to actually navigate to that document. They must also deal with the different features and user interfaces that the different applications provide for accomplishing this navigation. Thus, it would be desirable to provide apparatus and methods for displaying electronic documents that provides a single navigational history and a single, consistent user interface and set of features for performing navigation between documents.

SUMMARY OF THE INVENTION

The aforementioned problems are addressed by the invention, which provides apparatus and methods for permitting a user to view multiple contexts using a page-oriented architecture while maintaining a single navigational focus. As used herein, the term "context" encompasses any portion (one or more pages) of an electronic document. The term "multiple contexts" may refer either to plural portions of the same electronic document, or to respective portions of different electronic documents. The term "navigational focus" refers to the relationship between a set of navigational controls in the user interface and the frame that will be affected if those controls are used. In a user interface with a single navigational focus, there is only one set of navigational controls, there is no duplication of these controls on the screen, and there is only one frame at a time on which all navigational controls will act.

To accomplish viewing of multiple contexts, the invention introduces apparatus and methods for permitting a user to display a context as a "pinned" page overlayed on the display of another context. In an exemplary embodiment, the pinned page appears fixed in a region of the display on top of or beside the main document. While navigating an electronic book, for example, a user may "pin" a viewed page and thereby fix it on the display while the user continues navigating to other contexts in the main document.

The invention contemplates the use of a pinned page to view two non-contiguous locations in a single electronic document. The invention also contemplates the use of a pinned page to view two pages of respective different electronic documents. Still further, the invention contemplates the use of a pinned page to hold a particular context while a command set is executed from another context. For example, when a user desires to perform an action on a selected region or selected text in a main document, the user may open a quick reference sheet which appears on the display as the new main document while the document page with the selected region or selected text is automatically pinned. The invention also contemplates the use of a pinned page to provide a table of links for permitting a user to navigate to different pages within a main document or to different documents.

The ability to pin a page or portion of a first document context facilitates the maintenance of a single navigational focus while multiple contexts can be viewed. Pinning therefore permits the viewing of multiple contexts while maintaining simplicity in the user's navigational experience. Importantly, a pinned page does not have the same functionality of a prior art window inasmuch as a pinned page does not present the user with an additional navigational focus. Rather, a pinned page is conceptually similar to a "viewport" into a first document context which may be viewed while a second document context remains the subject of the navigational focus. Thus, a pinned page simply provides a user with a viewport to another page of the same document or a different document, without detracting from the user's current focus on navigation of the main document.

Another important aspect of page pinning according to the invention is that page pinning permits the active document context to be changed by the user, yet provides only one single navigational focus. To illustrate, first imagine that a user may be viewing a user document in two-page mode and then invoke the above-described quick reference sheet, thereby pinning the user document and shifting the navigational focus to the quick reference sheet. Then, the user may wish to shift the navigational focus back to the user document, for example, to select a region of text abridging pages of the user document. Accordingly, the user may pin the quick reference sheet and thereby shift the navigational focus back to the user document to select the abridging text. Then the user may re-pin the user document shifting the navigational focus back to the quick reference sheet to select a desired operation to be performed on the selected text.

The invention provides a single navigational focus to the user that is viewing multiple display contexts. Thus, one global set of navigational controls may be used to navigate within all of the multiple contexts being displayed to the user. The elimination of duplicate and disparate navigational controls is on advantage provided by the pinning model according to the invention. The pinning model simplifies the user experience while still providing the advantages of a multi-windowing system. In addition, the invention provides for any display context to act as a navigator for the context that has the navigational focus.

Page pinning according to the invention also eliminates the need for a user to manually manage multiple windows. The placement and sizing of pinned frames is performed automatically and without requiring intervention by the user. Moreover, pinned frames automatically optimize the presentation for side-by-side viewing. Since a user does not need to manually size and place frames to create a readable display, the user's navigational experience is simplified.

The page pinning mechanism provided according to the invention combines, in a single mechanism, the functionality that was previously available only through the use of a number of conventional and disparate user interface mechanisms. For example, page pinning according to the invention provides the functionality of a multiple windows user interface used for side by side viewing of information. It also provides the functionality of dialog windows for user interface/command functions. The functionality of navigational panes, such as the search pane provided by Internet Explorer browser developed by Microsoft Corporation is also provided by the page pinning mechanism according to the invention. Still further, the functionality of hierarchy panes which are typically used to display files and mail stored in a folder system and the functionality of "on top" frames for presenting "help" information to a user while the user navigates between documents is provided by the page pinning mechanism according to the invention.

Thus, the page pinning mechanism according to the invention simplifies the user interface, while making it more powerful. For example, any kind of page can be pinned and utilized as a navigational pane, regardless of what kind of page it is. A web page containing a set of useful links may be pinned and used to navigate to each of the links without the user losing sight of the page of links. Moreover, at any time in the navigational experience by a user, the user is able to search, sort, filter, annotate or perform any of the other above-described functions on any kind of page. Previously, these many functions were not available to the user at any time during the user's navigational experience.

The pinning model according to the invention also provides a single unified navigational history and a single, consistent user interface and set of features for performing navigation between documents. Thus, a pinned frame acts as a viewport onto some "past" node of the current navigation history, whereas the main document frame is a viewport onto the "present" node, this being the node relative to which navigation actions happen. This is in contrast to the prior art, in which there is no unified history, and where each window constitutes its own closed navigational history and its own set of navigational features and user interface controls.

For example, consider a situation where a user is viewing a document A in the main frame and a document B in a pinned frame. Further assume that there is a document C that in their use of the computer the user has visited in the past. Because of the unified history, A, B, and C are all accessible via the history navigational mechanism (such as the back/forward buttons). Thus, while A is in the main frame, the navigational controls can be used to navigate from A to either B or C. Likewise, suppose the user modifies the display to switch the states of A and B so that A becomes pinned and B becomes the main document. Even though a different frame has become the main frame (it is the frame, containing B, that was previously pinned), the user is still able to navigate from the active document in that frame (B) to either A or C. Note that because it is a common operation to switch the display state to reverse which frame is pinned and which is the main frame, an on-screen control is provided that will perform this switch as a single action.

In summary, the above example shows that no matter which frame is held as the current one, and no matter what document is displayed in that frame, the user can navigate to any document that was ever viewed in either frame, because all are part of the single, larger history. Regardless of which frame is the current one, the map of the navigation history will be the same. The on-screen frames act simply as viewports into the common history, with the distinction that the main frame is the one to which navigational controls and actions apply, and it is the frame whose displayed document is treated as the current or "main" one.

BRIEF DESCRIPTION OF THE DRAWINGS

The present invention is illustrated by way of example in the accompanying Figures, which should not be construed as limiting, in which:

FIGS. 3A and 3B illustrate an exemplary computer display and user interface for permitting a user to display the context of a command document according to the invention;

FIGS. 10A-10E are schematic diagrams illustrating the use of the page pinning mechanism of the present invention to view multiple contexts while maintaining a unified navigational history.

DETAILED DESCRIPTION OF THE INVENTION

Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
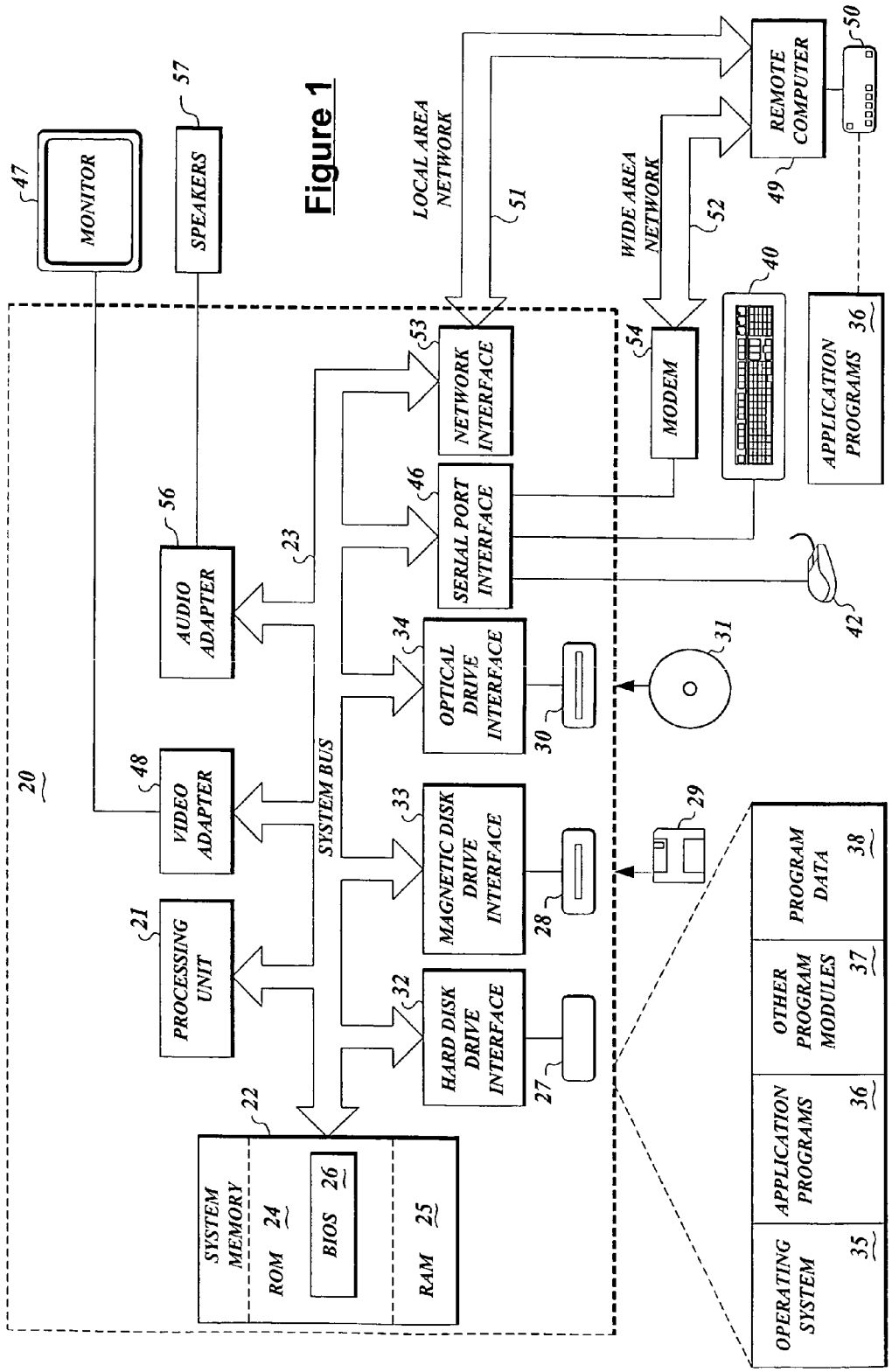
FIG. 1 is a schematic block diagram of a conventional general-purpose digital computing environment that may be used to implement various aspects of the present invention.

FIG. 1 is a schematic diagram of a conventional general-purpose digital computing environment that can be used to implement various aspects of the invention. FIG. 1 and the following discussion are intended to provide a brief, general description of a suitable computing environment in which the invention may be implemented.

With reference to FIG. 1, an exemplary system for implementing the invention includes a general-purpose computing device in the form of a conventional personal computer 20, having a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24.

The personal computer 20 further includes a hard disk drive 27 for reading from and writing to a hard disk (not shown). Also included are a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media are contemplated by the invention. For example, media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as remote computer 49. Each remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet. As depicted in FIG. 1, the remote computer 49 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

Figure 2A:
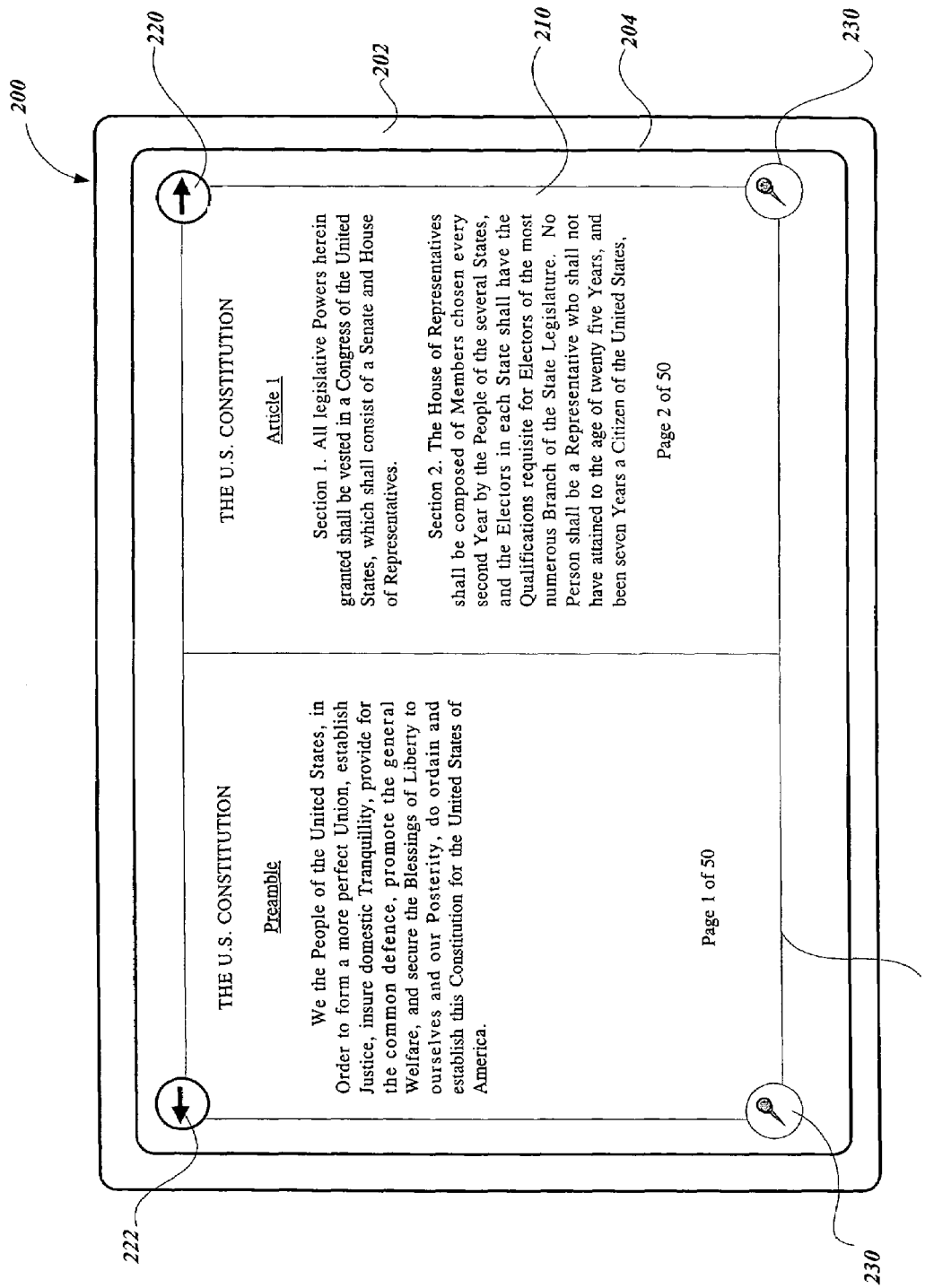
FIGS. 2A, 2B and 2C illustrate an exemplary computer display and user interface for accomplishing page pinning according to the invention.
Figure 2B:
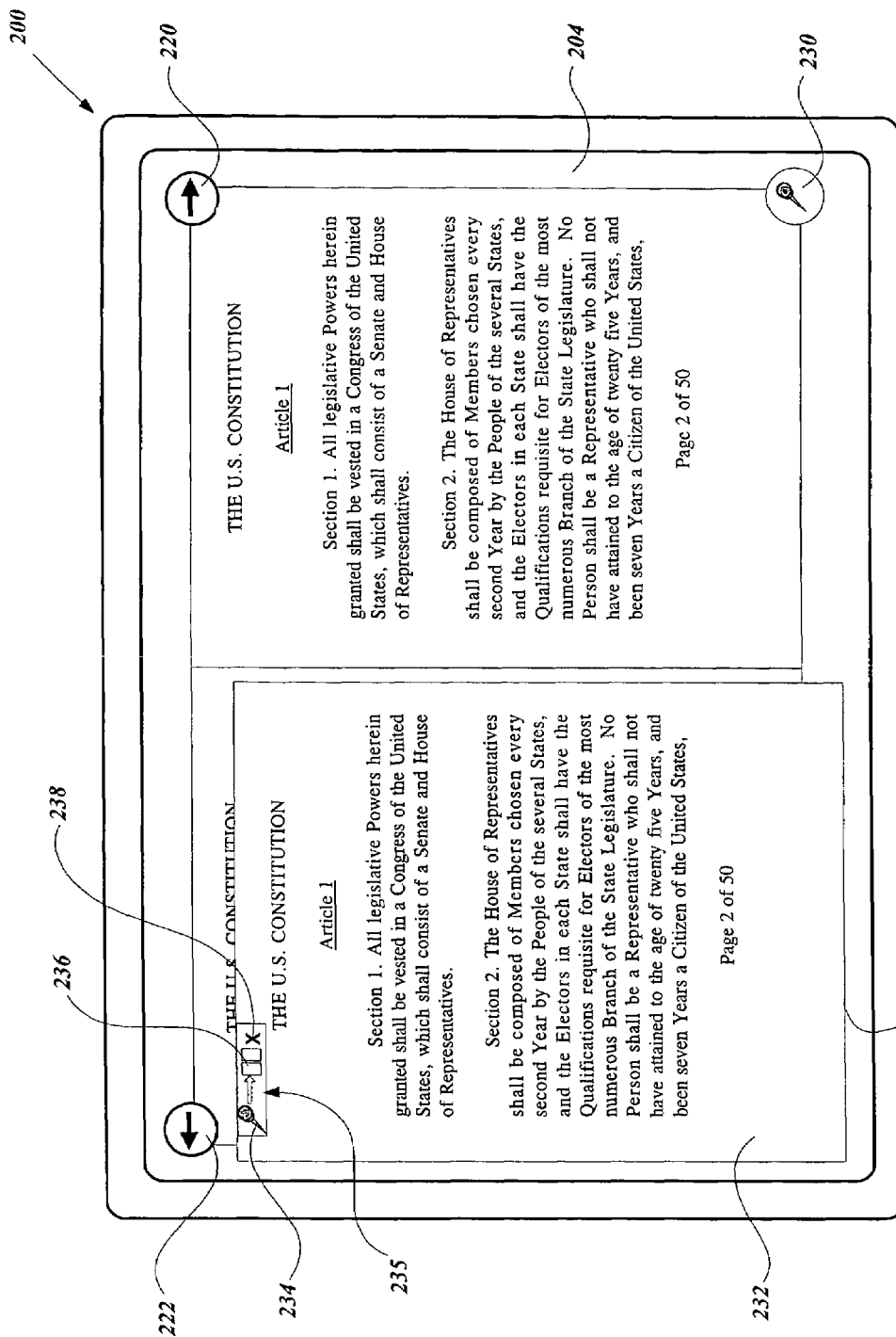
Figure 2C:
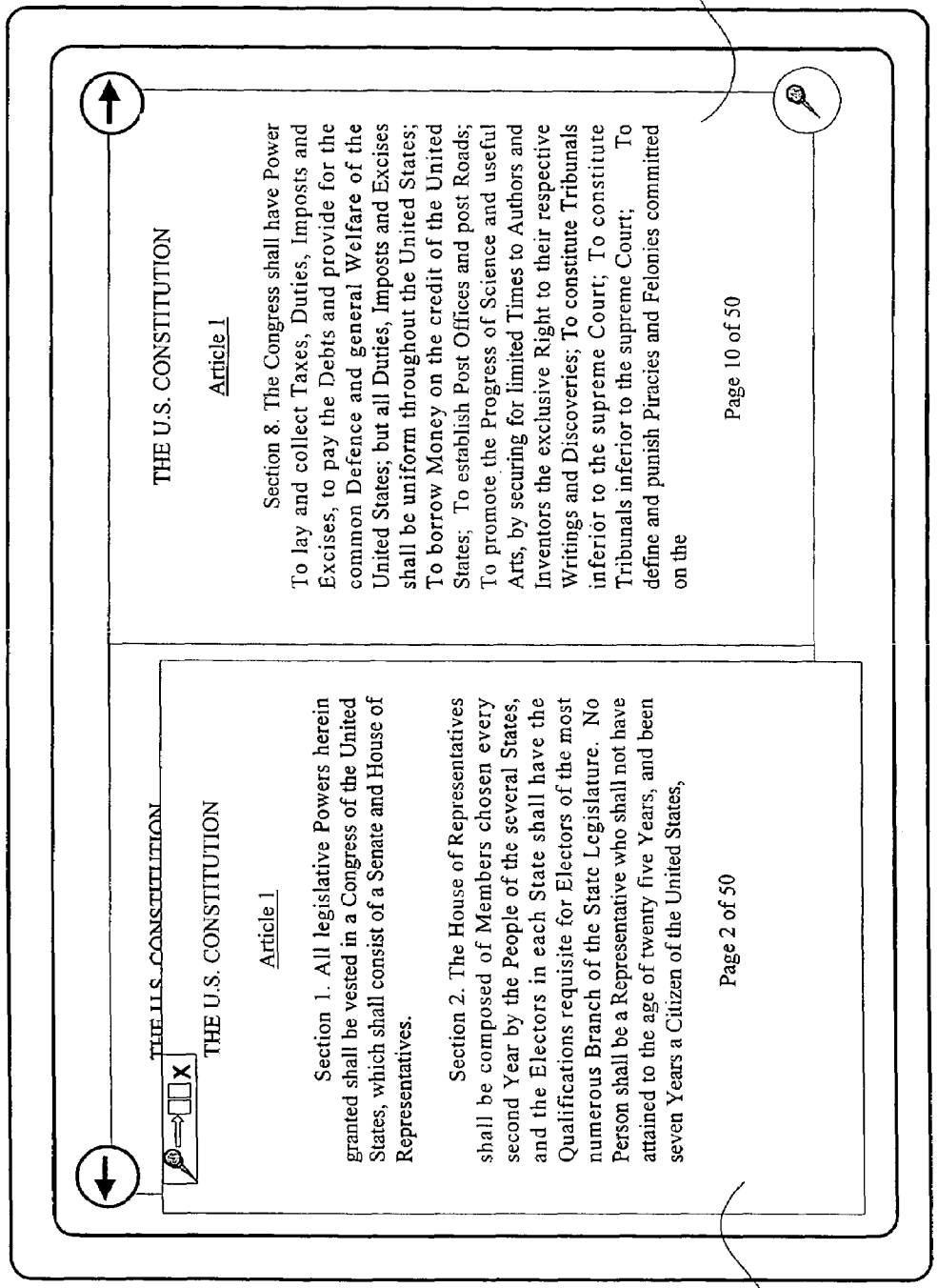

FIGS. 2A, 2B and 2C illustrate an exemplary computer and electronic display for accomplishing page pinning according to the invention. A personal viewer 200 is provided with a case 202 which may house some or all of the components of the computer 20 described above relative to FIG. 1. Also housed within case 202 is a display 204 for presenting an electronic document 210 to a user. Document 210 is displayed in a two-page format in an appropriate frame 205 depicted on display 204. According to an exemplary feature of the invention, display 204 depicts a forward paging button 220 and a back paging button 222 for permitting a user to navigate through the main document 210 in a manner that mimics the paging through a printed book or magazine. Preferably, display 204 incorporates a selection device that includes a touch-sensitive screen which enables a user to activate various controls depicted on the display by simply touching the region of the display in which a particular control appears. Alternatively, viewer 200 may be provided with other forms of selection devices, including a stylus or pen for activating particular controls depicted on display 204 or even a mouse and cursor arrangement as is known in the art.

Also depicted on display 204 are two pinning buttons 230, one for each page displayed. When pinning buttons 230 are selected by a user, as will be described in more detail below, an appropriate signal is generated to invoke a series of steps within the viewer 200 to display the selected page as a pinned page. Referring particularly now to FIG. 2B, when a user has selected the pinning button 230 associated with page 2 of the displayed document, a new frame 235 appears in display 204 containing a pinned page 232, in this case page 2 of the document. Also appearing in frame 235 is a pinned page indicator 234 for denoting the pinned page to the user. A control box 235 is depicted and contains two controls: a main document button 236, which permits the user to activate the document associated with the pinned page 232 as the main document to be navigated; and a close button 238 for enabling a user to dismiss the pinned page 232.

It will be recognized by those of ordinary skill that the above-described presentation of a pinned page is merely exemplary and may be modified without departing from the scope of the invention. For example, a pinned page could be presented as a floating pane above the main document, or the border of the pinned page could be outlined in a specific color to denote that it is a pinned page Significantly, the presence of pinned page 232 does not affect the navigational focus, which currently remains with pages 1 and 2 of the main document 210, which appear beneath the pinned page 232. A user may navigate through the main document by activating the forward paging button 220 or the back paging button 222 and this focus is always clear to the user. Referring specifically now to FIG. 2C, after a user has navigated within the main document to a different context, in this case pages 9 and 10 of the main document, the pinned page 232 remains displayed above or beside the main document, thereby permitting the user to view two non-contiguous portions of the same document while maintaining a single navigational focus It will be recognized that the above-described viewing architecture will permit a user to view pages of two different electronic documents. In that case a user would simply pin a desired page of a first document and then navigate to a second document, which would appear beneath or beside the pinned page 232. Although not illustrated, viewer 200 would be provided with appropriate interface features to permit a user to select and open a second document after pinning the desired page of the first document.

Figure 3B:
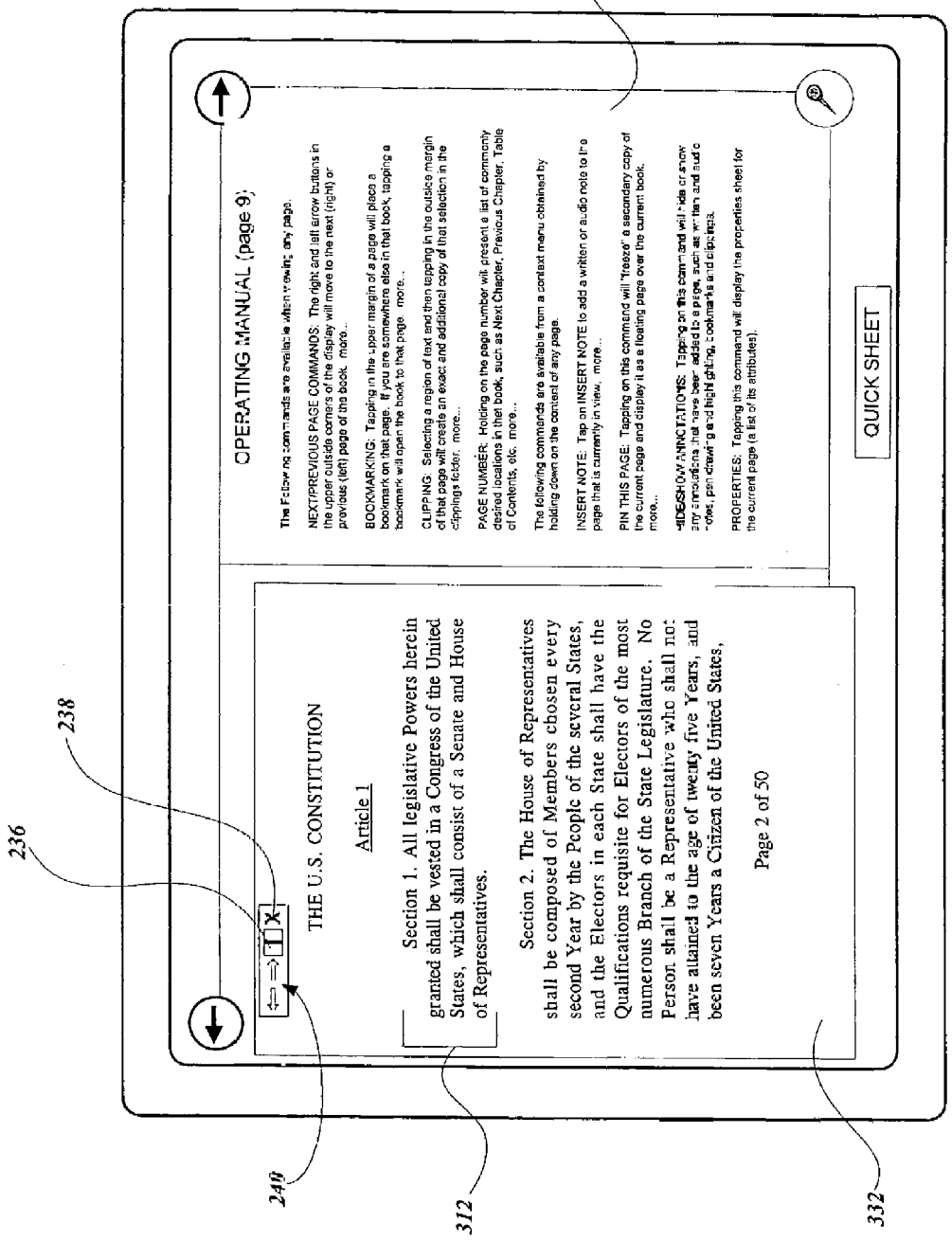

FIGS. 3A and 3B illustrate an exemplary computer and electronic display for permitting a user to display the context of a command document according to a primary feature of the invention. Display 204 depicts a QUICK SHEET button 310 for permitting a user to generate a command document selection signal which, in a manner that will be explained below, permits a user to execute general commands or commands which impact a target region of the main document. Although depicted as a button outside of the main document context, button 310 could alternatively be provided as a link within the main document context. Typically, a user may be viewing a first document context and desire to perform a command on a selected region 312 of a page in the first document context. After selecting the appropriate region using the selection device, the user activates the QUICK SHEET button 310, which generates a command document selection signal. In response to the command document selection signal, a page pinning signal is generated to pin the page corresponding to the selected region 312. Then, a document 320 comprising at least one command becomes the subject of the navigational focus, permitting the user to navigate the document 320 and select an appropriate command, such as CLIPPING or formatting commands which will affect the selected region or text 312. With respect to pages comprising at least one command, such pages may include fill-in forms, such as a user-interface dialogue that accepts parameters in order to perform some action on a selected document. For example, a pinned page comprising at least one command might include a form for entry of a font name and size with the entered parameters for font and size being applied to a selected region of text in a main document on which the command is to be performed.

It will be recognized that not all of the commands 322 require the selection of text or a region of a page. As illustrated, the document 320 may list general commands, such as NEXT/PREVIOUS PAGE, BOOKMARKING, INSERT NOTE, PIN THIS PAGE, HIDE/SHOW ANNOTATIONS or PROPERTIES, that may provide navigational or annotating functions, for example. It will be recognized that, since the document 320 is a navigable main document, a user may navigate through the document 320 to one of a number of pages of commands, or may use the SEARCH command to search for command content within the command document itself. Importantly, a single navigational focus is maintained throughout the display of the document 320 and the selection of a command from the document 320.

According to the above described embodiment, activation of the QUICK SHEET button 310 results in the document 320 becoming the subject of the navigational focus, those of ordinary skill will recognize that the reverse implementation is within the scope of the invention. That is, activation of the QUICK SHEET button 310 could result in the document 320 being pinned while the navigational focus remains with the first document context.

The above implementation of pinning a document comprising at least one command illustrates one of the fundamental features of the invention: permitting the active document context to be changed by the user while maintaining only one single navigational focus. The user may be viewing the first document in two-page mode and then invoke the quick reference sheet, thereby pinning the user document and shifting the navigational focus to the quick reference sheet. Then, the user may wish to shift the navigational focus back to the user document, for example, to select a region of text abridging pages of the user document. Accordingly, the user may pin the quick reference sheet, thereby shifting the navigational focus back to the user document to select the abridging text, then re-pin the user document shifting the navigational focus back to the quick reference sheet to select a desired operation to be performed on the selected text. Thus, the active document context may be changed by the user, but the single navigational focus remains apparent to the user at all times.

The invention also contemplates providing a control associated with each context to permit a user to toggle the navigational focus between contexts. For example, a focus shift command icon may be incorporated into the border area of each display frame 205 (FIG. 2A) and 235 (FIG. 2B). When a user activates the focus shift command icon in the border area of a pinned page, the currently active document will become pinned and the currently pinned document will become the active document. Likewise, when a user activates the focus shift command icon in the border area of the currently active document, the currently active document will become pinned and the pinned document will become the active document.

Figure 4:
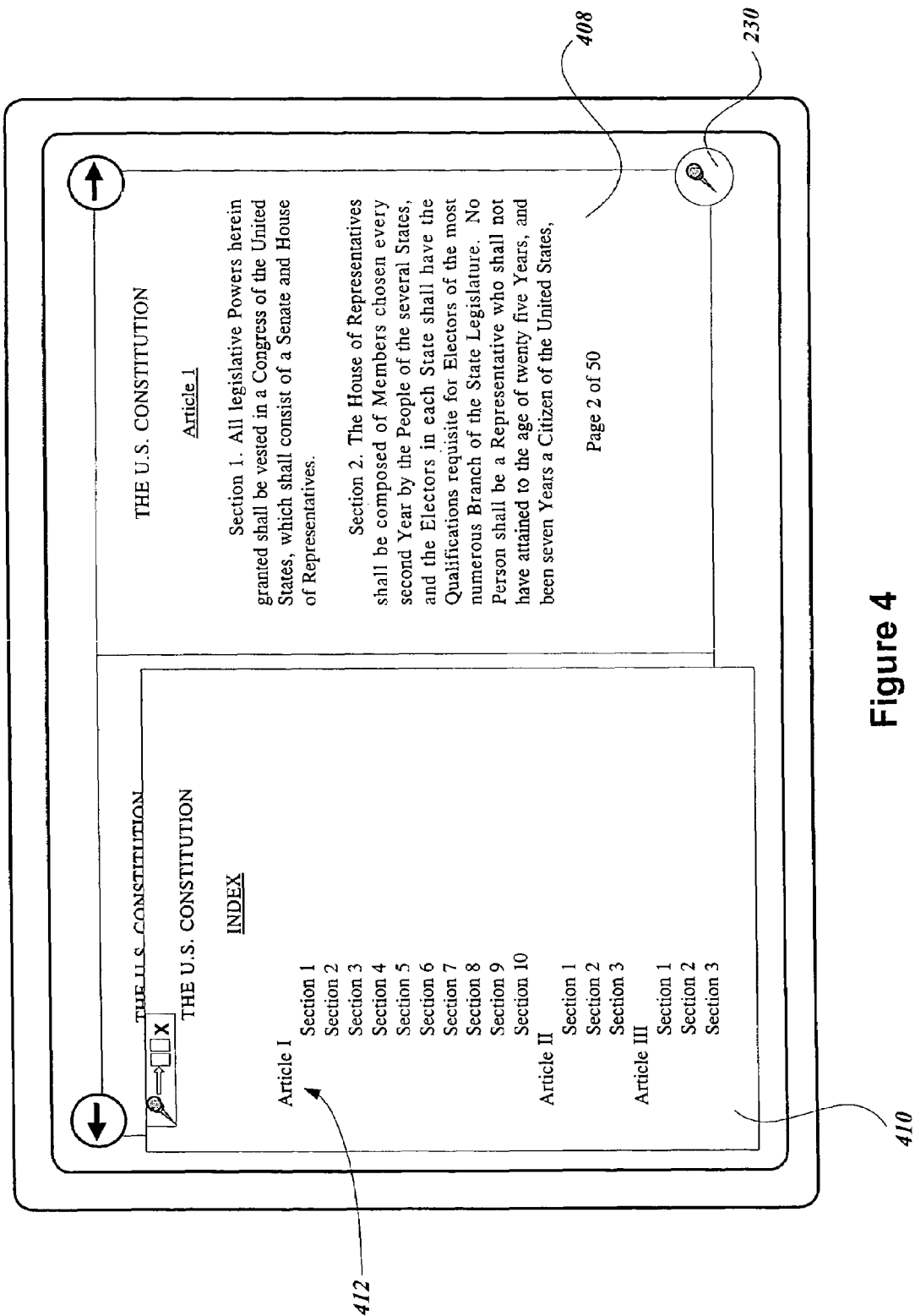
FIG. 4 illustrates an exemplary computer display and user interface for permitting a user to pin an index page according to the invention.

FIG. 4 illustrates an exemplary computer and electronic display for permitting a user to pin a page with an index and navigate a document according to the invention. Main document 408 may include a page 410 comprising at least a table of contents or an index including a number of navigational links 412 to various sections of the main document 408. A user may navigate the main document 408 to the page 410 and then select the appropriate pinning button 230 to pin the page 410. Once the page 410 is pinned, the user may select appropriate links thereon to navigate the main document to a particular desired location. Note that any page can be pinned in this way so that it will act as a navigator for the current document. As long as the pinned page has links on it, activating one of those links with the stylus, finger or mouse will cause the contents of the main document frame to navigate. For example, if a given page of a large document has many cross reference links of interest, the user may pin that page so that the various cross-references can be conveniently explored. Thus, any document or context becomes a navigational tool to the user when the navigational focus is shifted, via page pinning, to that document or context.

It may be the case the pinned document contains links that span more than one page and the user needs to view one of these other pages. Also, the user may wish to change what page is currently pinned. To do this, the user may use the focus shift control described earlier. This will switch the roles of the two frames, making the pinned one become the current frame and the (previously) current frame become the pinned frame. The user may now navigate the (previously) pinned document to the desired page or other document, and then use the focus shift control again to make the other document current again.

It will be recognized by those of ordinary skill in the art that the pinning mechanism of the invention may be applied to any kind of page or document and the particular pinning actions performed may be determined by the properties of a particular link, whether the link represents a command or a navigation action. In the case where the pinned page contains navigable links, the pinned page will function as a "navigating" page. In the case where the pinned page contains commands, the pinned page will function as a "command" page. Thus, utilization of a particular page as a navigating page or command page according to the invention does not require that the navigating page or command page be constructed according to a particular format. Moreover, commands and navigable links may appear on the same page. For example, a web page with navigable links could function as an index page for navigating among the set of destinations corresponding to its links, even though the web page might also contain graphical command links or is otherwise not constructed according to a conventional format of an index.

In accordance with another aspect of the invention, a "pin on follow" feature is provided. According to this feature, index documents, such as a user's e-mail inbox is first represented as a two-page display of index (in this case message) entries. The first time the user activates one of the entries or links in the index, the index automatically becomes pinned and the linked-to document—the document corresponding to the activated entry or link—is displayed and becomes the active context. Subsequently, the index acts as the navigational tool for the active context. The "pin on follow" feature provides two primary benefits: 1) the user is initially provided with a two-page or full screen view of the index, thereby permitting ease of navigation and other actions, such as filtering or sorting; and 2) the automatic pinning of the index as a navigational tool saves the user the inconvenience of having to manually pin the page comprising at least an index. And with the page comprising at least an index now pinned, it is set up to provide a navigational function that in the present art is provided by a feature called "navigation panes". Unlike the prior art, the use of pinning requires no unique feature or set of user interface tools/techniques to provide the navigation pane function.

It will be recognized by those of ordinary skill in the art that the navigational architecture described above is equally applicable to other types of documents besides electronic books. For example, as presented in the preceding paragraph, a system for viewing e-mail may be provided according to the same architecture, where the index may correspond to a listing of all available or new e-mail pages. By pinning the inbox, a user would be able to navigate to a selected e-mail simply by selecting the appropriate link on the pinned page. As another example, web pages that today use HTML frames to contain lists of navigational links or other information could instead use pinned views. The benefit is that the user of a pinned view can at any time make it the main one so that it can be viewed full screen, or alternatively may dismiss it altogether; these functions are not possible with HTML frames.

Those of ordinary skill will recognize that the invention provides an architecture which replaces the traditional user interface feature commonly referred to as "always on top windows". Help windows are an example of a kind of window that is displayed as always on top in many applications. The objective of such architectures is to provide a means to keep help information in view regardless of what kind of navigation actions the user may perform within an application. In known windowing architectures, if a document is displayed in one window and help in another window, then depending on the relative size and position of those and other windows, the help window may become obscured if the always-on-top features is not provided. The pinning model according to the invention provides "always on top" behavior as an inherent feature of its design, so that a separate notion of "always on top" windows is not needed. Thus, displaying "always on top" help is just another example of the side by side viewing of different documents, with one of the documents being the help document (in the pinned frame) in this case.

Figure 5:
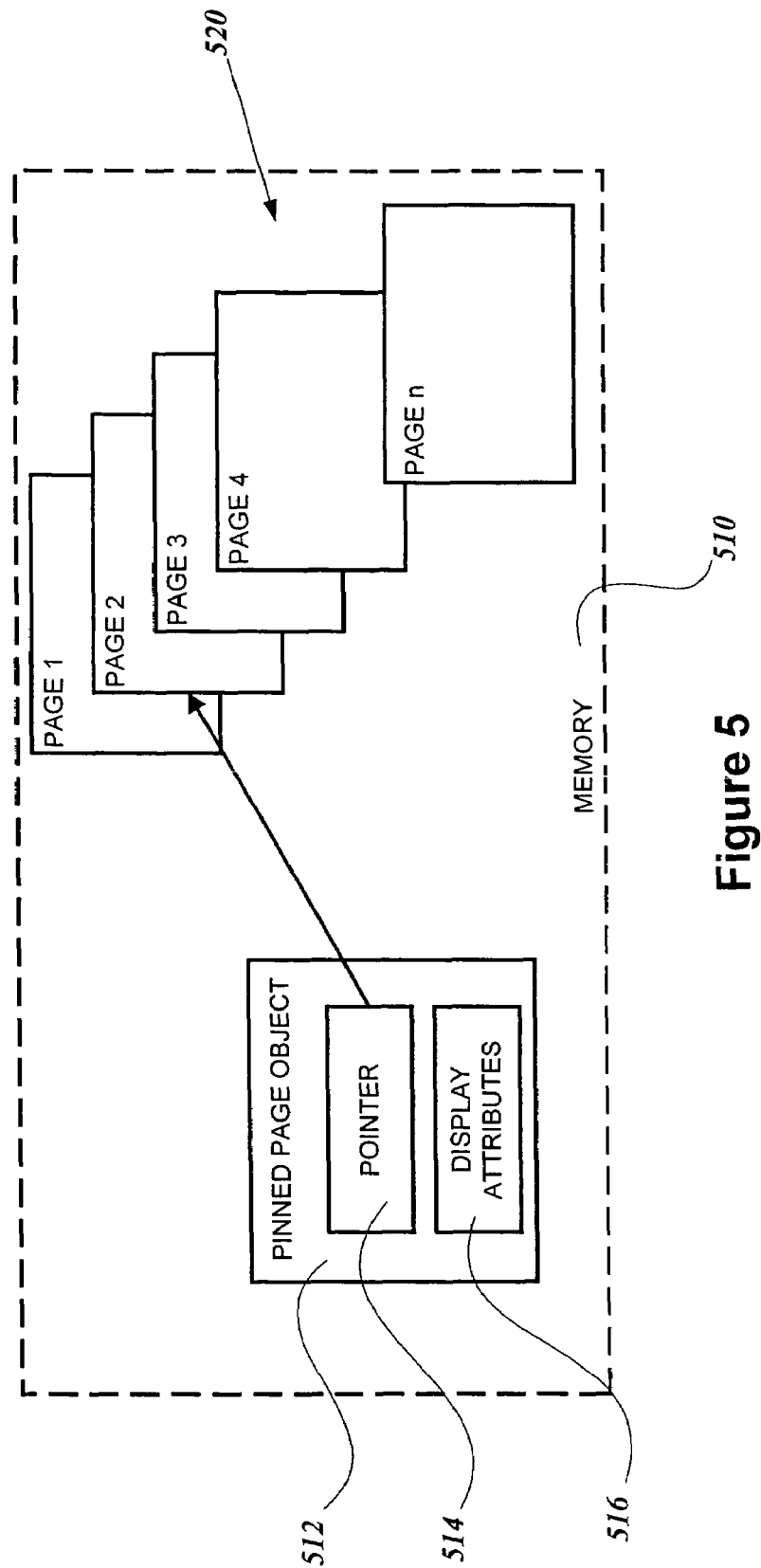
FIG. 5 is a schematic block diagram illustrating a pinned page object and its relationship to a document according to the invention.

FIG. 5 is a schematic block diagram illustrating a pinned page object and its relationship to a document according to the invention. Memory 510, which may include system memory 22 (FIG. 1), or any of the storage devices depicted in FIG. 1, includes at least one document 520 stored therein and containing a number of pages, 1 through n. When a user provides a page pinning signal to pin a selected page of the displayed main document, a pinned page object 512 is created in memory 510. Pinned page object 512 includes a pointer 514, which is a reference to a particular page and document corresponding to the page for which the pinning signal has been provided. Pinned page object 512 may also contain display attributes 516 which may include parameters such as frame size and location on the screen and which govern the display of the pinned page on the screen. Those of ordinary skill in the art will recognize that the command page pinning features of the invention result in similar pinned page objects 512 in memory 510. This stems primarily from the treatment of all navigable contexts as documents. Thus, the command page is merely a page of an electronic document that contains appropriate links or shortcuts to executable commands.

Figure 6:
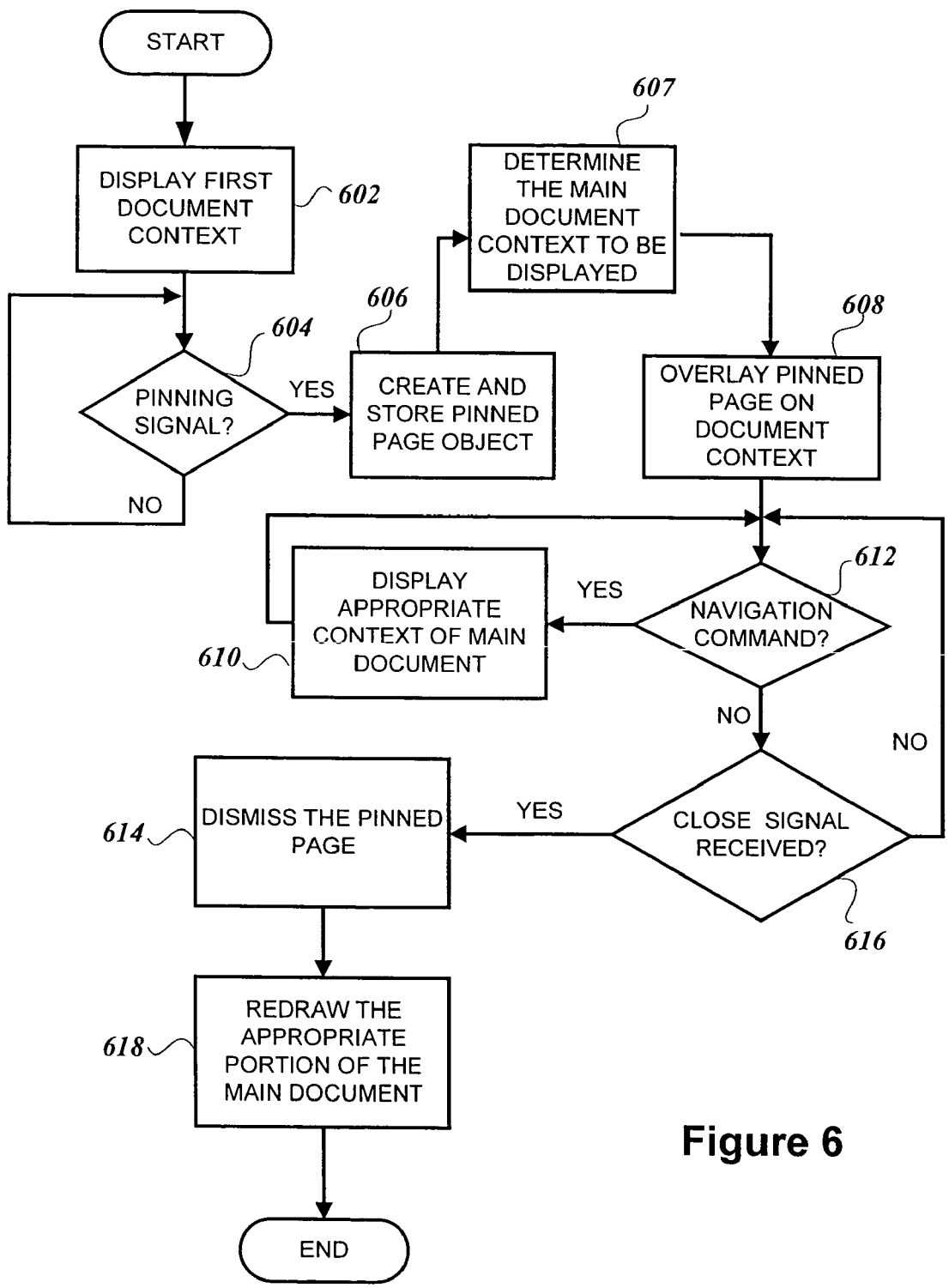
FIG. 6 is a flow diagram illustrating an exemplary method for pinning a page according to the invention.

FIG. 6 is a flow diagram illustrating an exemplary method for pinning a page according to the invention. The process begins at step 602 where a first document context is displayed according to display routines stored in memory. After display of the main document and as a user navigates the main document, the process continually or periodically checks for the presence of a pinning signal at step 604. If no signal is received, step 604 repeats. If a pinning signal is received, the process proceeds to step 606 where the pinned page object 512 (FIG. 5) is created, including a pointer to the page that is desired to be displayed. At step 607, a heuristic determination is made as to which main document context is to be displayed. As will be explained in more detail below, the invention contemplates heuristics to govern what should appear as the main document. In the simplest case, the main document context at step 607 will be the same context displayed at step 602. However, as will be explained in more detail below, different document contexts may become the main document context at step 607 depending on various heuristic determinations. The process then proceeds to step 608, where the pinned page is displayed within the appropriate frame overlayed on the current document context. The current document context may correspond to the same document containing the pinned page, or the current document context may be a new document opened by the user. The process then branches to step 612 where a determination is made as to whether a navigation command is received. If so, the process proceeds to step 610 and the appropriate context of the main document is displayed beneath the pinned page. The process then branches back to step 612. If, at step 612, it is determined that no navigation command is received, the process next determines at step 616 if a close signal is received for the pinned page. If not, the process branches back to step 612. If so, step 614 is executed, the pinned page is dismissed from the display and the revealed portion of the main document is redrawn at step 618.

As described generally above, step 607 represents a heuristic determination of the main document context to be displayed. In the simplest case, the main document context determined at step 607 will be the same context displayed in step 602. However, at step 607, a different document context may be determined for display in which case the pinned page overlayed at step 608 will be overlayed on a document context that is different from the one displayed in step 602. For example, the main document context to be displayed might correspond to one from which a pinned page had been pinned from before. In other words, the association of a pinned document to a main document is remembered so that the same state can be automatically restored when appropriate upon the pinning of a previously pinned document.

As another example, when the user is viewing a main document with the Quick sheet or other page comprising at least one command pinned, they may unpin the Quick sheet in order to navigate among various pages each comprising at least one command. Having navigated to a desired page comprising at least one command, the user may pin that desired page. Rather than the main document continuing to show a page of the document comprising at least one command, the main document navigates back to show the document that was in view as main when the Quick sheet was originally unpinned. Thus, the user has the effect of unpinning in order to navigate among commands, and then repinning, so that the desired new page comprising at least one command is automatically presented in context with the user content the new page will operate on. As a result, the user is saved from the work of manually navigating back to the user document after having first navigated through the document comprising at least one command to find a needed command.

Yet another example would involve comparing two documents side by side. While viewing a first document, the first document is pinned so a second document can be viewed side by side. After navigating the second document to the desired page, the first document is unpinned so it too can be navigated to a desired page. Repinning the first document automatically brings back the previously viewed page of the second document in the main document frame, so the original side by side viewing context is restored. There may be other heuristics that govern the decision of what to display as the main document when a pinning signal is received. For example, when tapping a link that opens a user interface form (equivalent to a dialog box in prior art), the current document remains as the main document. The form is simply opened as a pinned document without changing the main document.

Figure 7:
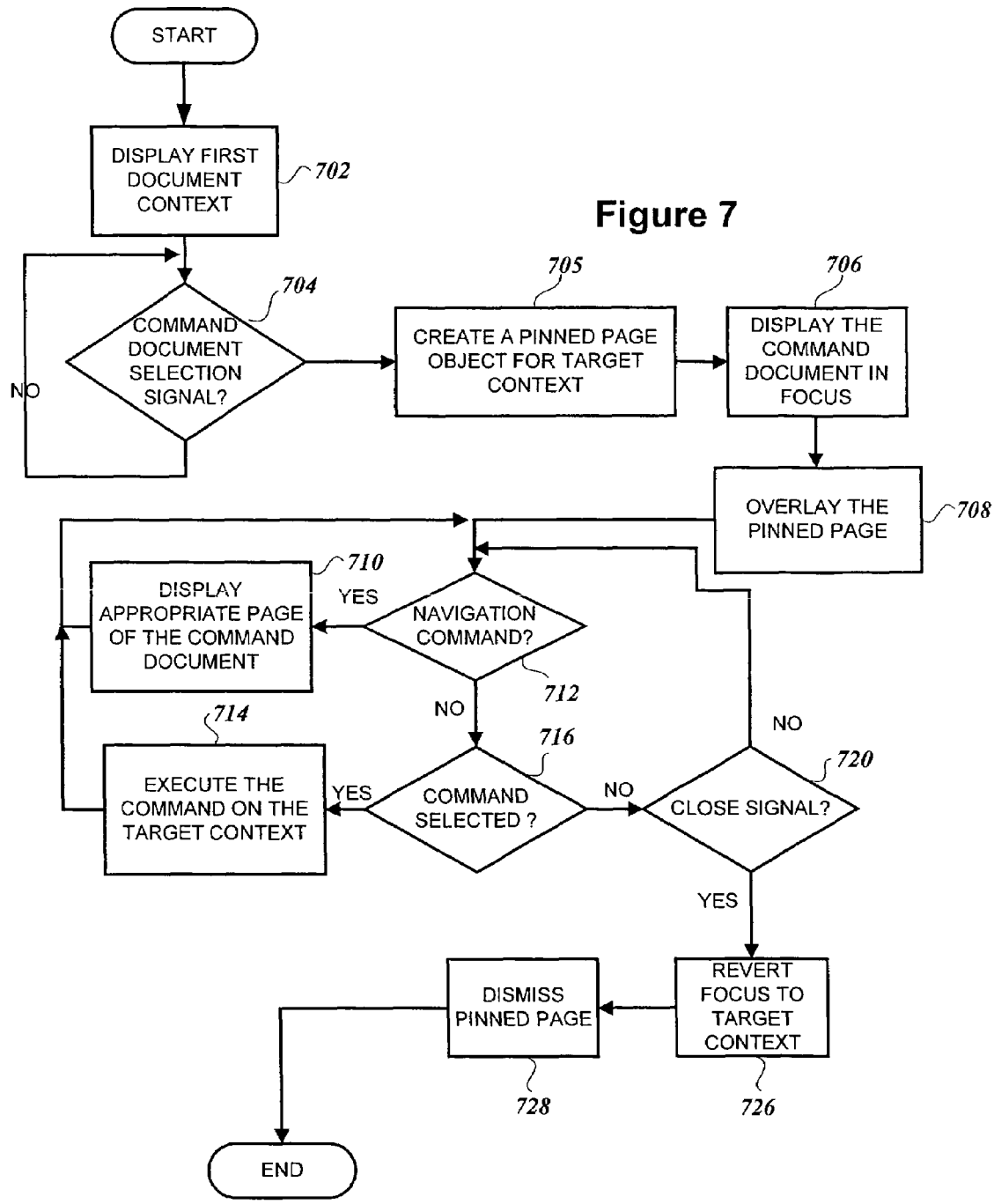
FIG. 7 is a flow diagram illustrating an exemplary method for pinning a command page according to the invention.

FIG. 7 is a flow diagram illustrating an exemplary method for pinning a page comprising at least one command according to the invention. The process begins at step 702 where the first document context is displayed according to display routines stored in memory. After display of the main document and as a user navigates the main document, the process continually or periodically checks for the presence of a command document selection signal at step 704. If no signal is received, step 704 repeats. If a command document selection signal is received, the process proceeds to step 705 where a pinned page object is created including a pointer to the page corresponding to the target context—the context upon which the user desires to perform a command. At this point, the target document is still the subject of the current navigational focus. Then, at step 706, the command document is displayed under the navigational focus. At step 708, the pinned page is displayed within a frame overlayed on the command document context.

The process then branches to step 712 where a determination is made as to whether a navigation command is received. If so, the process proceeds to step 710 and the appropriate context of the command document, is displayed beneath or beside the pinned page. The process then branches back to step 712. If, at step 712, it is determined that no navigation command is received, the process next determines at step 716 if a command has been selected by the user. If so, the command is executed on the target context at step 714. If, however, at step 716, no command is input by the user, the process branches back to step 712.

If at step 716, it is determined that no command is selected, the process then determines whether a close signal has been received at step 720. If so, the navigational focus reverts to the target context at step 726 and the pinned page is dismissed at step 728.

Figure 8:
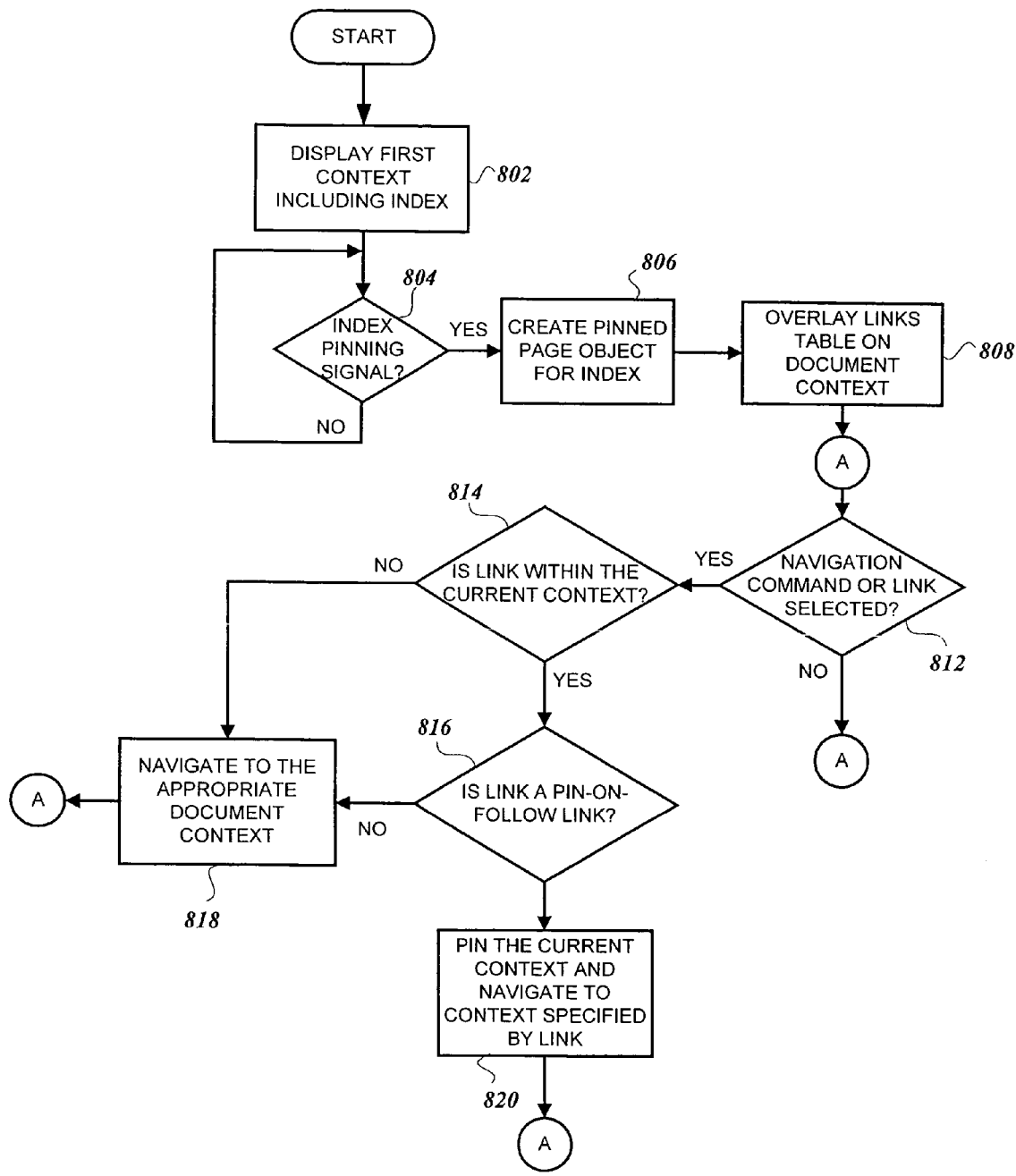
FIG. 8 is a flow diagram illustrating an exemplary method for pinning an index page according to the invention.

FIG. 8 is a flow diagram illustrating an exemplary method for pinning an index page and for implementing a pin-on-follow feature according to the invention. The pin-on-follow feature is logic that causes certain pages, such as a page comprising at least an index or a table of contents, to be pinned when one of the links they contain is followed. The process begins at step 802 where the first document context, including an index, is displayed according to display routines stored in memory. At step 804, a determination is made as to whether an index pinning signal has been received. If so, the process branches to step 806, where a pinned page object, including a pointer to the page comprising at least an index is created. Then, at step 808, the page comprising at least an index is displayed within the appropriate frame overlayed on the main document context according to conventional display techniques.

The process then branches to step 812 where a determination is made as to whether a navigation command is received or whether a link is selected. If so, the process proceeds to step 814 where a determination is made as to whether a link was selected and whether the selected link is within the current context. If not, at step 818 the system navigates to the appropriate document context at step 818. If at step 814 it is determined that the link is within the current context, the process branches to step 816 where a determination is made as to whether the link is a pin-on-follow link. This can be determined by evaluating the properties of the link, or the properties of the page containing the link or the properties of the document or other system information. If at step 816 it is determined that the link is a pin-on-follow link, the process at step 820 pins the current context and navigates to the context specified by the link and the process returns to step 812. If, on the other hand, at step 816 it is determined that the link is not a pin-on-follow link, the appropriate context is navigated to at step 818 and the process returns to step 812.

Those of ordinary skill in the art will recognize the processes depicted in FIGS. 7 and 8 have been explained separately for the purposes of clarity to illustrate that different steps may be performed depending on whether a user input signal represents the selection of a document comprising at least one command or selection of a page comprising at least an index or a table of contents, however, the invention is not limited thereto. In the present invention, decisions that affect pinning behavior, such as whether to do pin-on-follow, are based on inspecting properties associated with the link that was activated. These properties may be hard-coded on the link, determined based on the type of the link, and/or inherited from other sources, such as the page that the link is contained on.

Figure 9:
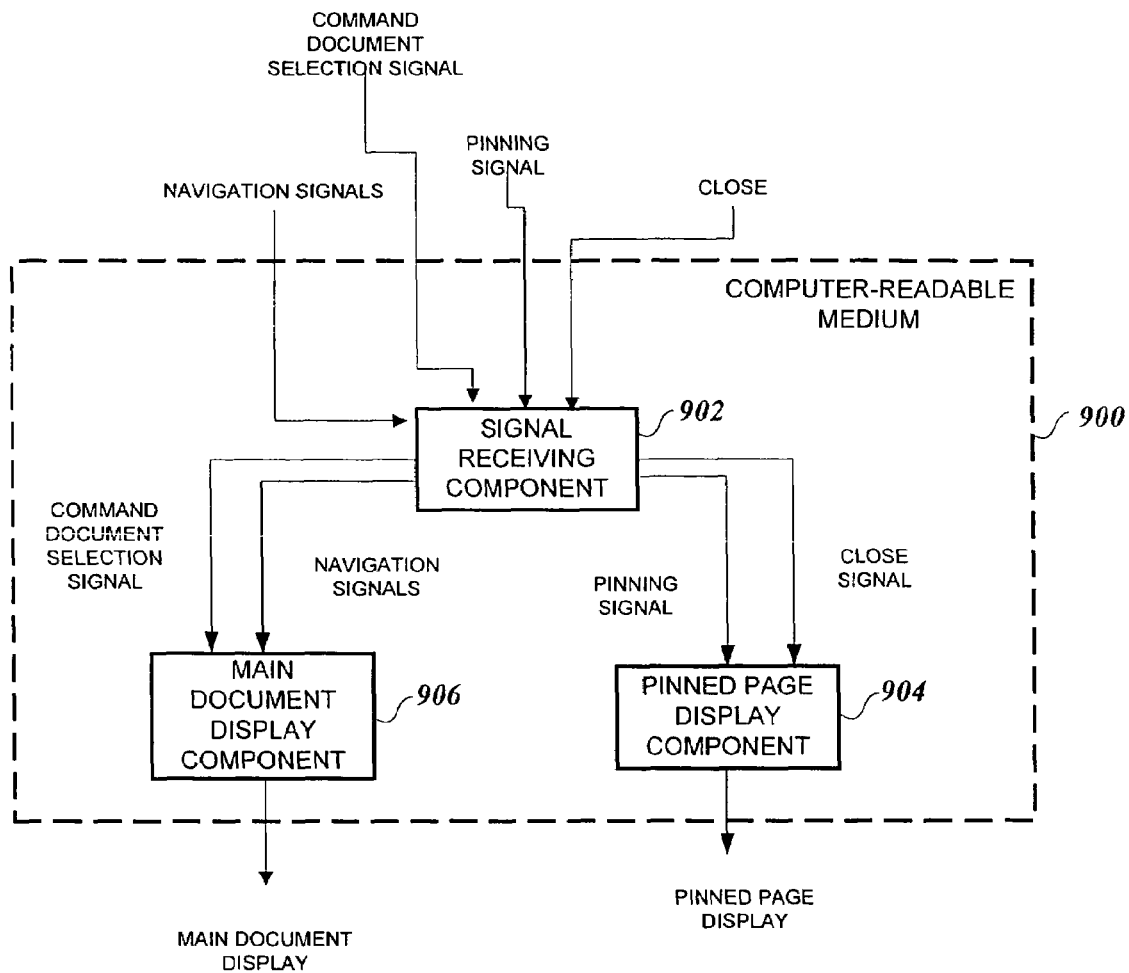
FIG. 9 is a block diagram of an implementation of the present invention on a computer-readable medium.

FIG. 9 is a block diagram of an implementation of the present invention on a computer-readable medium. A computer-readable medium 900 may include any of the storage elements depicted in FIG. 1, including RAM, ROM, magnetic storage media, such as floppy disks or internal hard disks, optical storage media or memory cards. Computer-readable medium 900 includes a signal receiving component 902 for receiving signals corresponding to user activation of controls, i.e., soft buttons, displayed on display 204 (FIG. 2) or controls implemented in hardware, i.e., hard buttons integrated into the personal viewer case 202. The signal receiving component 902 receives as input a command document selection signal, navigation signals, page pinning signals and closing signals when appropriate hard or soft controls are executed by the user. Command document selection signals and navigation signals are conveyed from the signal receiving component 906 to the main document display component and processed thereby to govern the main document display. Page pinning signals and closing signals are conveyed to and processed by the pinned page display component 904 to govern the display of the pinned page.

FIGS. 10A-10E illustrate the use of page pinning to permit a user to view different document contexts while maintaining a single, unified navigational history according to yet another aspect of the invention. FIGS. 10A-10C depict three respective document contexts that are displayed as a user navigates. FIG. 10A represents a first document context "A" appearing in a main frame "M" and FIG. 10B represents a second document context "B" appearing in the main frame "M" to which a user navigates using a navigational control, such as a back/forward button or by selecting an appropriate link in the "A" context, for example. The navigational history created by this navigation is represented on the far right side of FIG. 10B. FIG. 10C represents the display after the "B" context has been pinned in a pinned frame "P" and a third document context "C" has been navigated to. The navigational history is now represented as A-B-C as shown in the far right side of FIG. 10C.

Significantly, the page pinning mechanism according to the invention, because a pinned page acts as a "viewport" on a previous context in the navigational history, enables a user to view any previously viewed context without modifying the navigational history, which remains unified. As illustrated in FIG. 10D, a user may modify the display to switch the states of the contexts shown in FIG. 10C, by activating a navigational control, for example. Thus, context "C" becomes the pinned context and context "B" is displayed in the main frame "M" which is the subject of the navigational focus. Notably, this state change does not change the navigational history, which remains as it was before the state change. Thus, a user may navigate from the "B" context to the "A" context as shown in FIG. 10E, yet the navigational history remains unchanged. Moreover, the navigational history is maintained regardless of which context is currently displayed in the main frame or the pinned frame. This is because both the pinned frame and main frame act as viewports on the navigational history, with the main frame being the context to which navigational controls are applied.

Although the invention has been described above, it should be appreciated that a variety of modifications will be readily available to persons utilizing the invention. The foregoing description is not intended to be limiting, but is merely illustrative of an exemplary adaptation of the invention. Other products, apparatus and methods that incorporate modifications or changes to that which has been described herein are equally included within this application. For example, it will be apparent to artisans of ordinary skill that the invention is equally applicable to various document display architectures, including page-oriented architectures and scrolling-oriented architectures, wherein scrolling bars rather than "next page" or "forward/backward" controls are associated with the display frames. Moreover, although described in the context of viewing two documents or contexts simultaneously, the invention contemplates the viewing of more than two documents or contexts simultaneously, while maintaining a single navigational context.

The invention claimed is:

1. In a computer system having a user interface, including a display and a selection device, a method to unify navigational control displaying multiple contexts of electronic documents comprising the steps of:

displaying, in the user interface, a first frame, including a first document context navigational association which is the subject of a single navigational focus, the single navigational focus being controllable by a user that is viewing multiple contexts of electronic documents and defined as including a single set of navigational controls in a displayable pinned page object configured to control all contexts within a frame of the display;

displaying, in the user interface, a second frame, including a second document context simultaneously with the first document context while maintaining the single navigational focus associated with the first document context; and shifting the navigational focus by user selection to the second frame from the navigational association with the first document context to a navigational association with the second document context, the single set of navigational controls in the user interface configured to control the second document context in the second frame while maintaining control of the second document context within the displayable pinned page object configured to control all contexts, wherein at least one other document context navigational association is accessible by navigation from the first document context navigational association and at least one other document context is accessible by navigation from the second document context navigational association.

2. The method of claim 1, wherein the first and second document contexts are non-contiguous parts of the same electronic document.

3. The method of claim 1, wherein the first and second document contexts are parts of different electronic documents.

4. The method of claim 1, further comprising the step of receiving a page pinning signal input by a user, and wherein the step of displaying, in the user interface, a second frame, including the second document context occurs in response to the page pinning signal.

5. The method of claim 1, wherein the step of displaying, in the user interface, a second frame, including the second document context comprises displaying a document comprising at least one command in response to a command document display signal input by a user, the method further comprising the step of permitting the user to select a command from the at least one command in the document.

6. The method of claim 5, wherein the command document display signal automatically initiates a page pinning signal that results in the display of the first document context as a pinned page overlayed on the document comprising at least one command.

7. The method of claim 5, wherein the command document display signal automatically initiates a page pinning signal that results in the display of the document comprising at least one command as a pinned page overlayed on the first document context.

8. The method of claim 1, wherein the step of displaying, in the user interface, a second frame, including the second document context comprises displaying a page comprising at least an index and wherein the index is provided with at least one link, the method further comprising the step of pinning the page comprising at least an index and displaying a context corresponding to a link selected by the user from the index.

9. The method of claim 1, wherein the step of displaying, in the user interface, a second frame, including the second document context further comprises the steps of:

receiving a page pinning signal from a user; and in response to the page pinning signal, displaying a viewport to the first document context as a pinned page overlayed on the second document context.

10. The method of claim 1, wherein the step of displaying, in the user interface, a second frame, including the second document context comprises the step of displaying an index having at least one link and a corresponding context associated with each link.

11. The method of claim 10, further comprising the step of displaying a third document context in response to a user selecting a corresponding link.

12. A computer-readable medium having computer-executable components for performing a method to unify navigational control displaying multiple contexts of electronic documents that, when executed by a computer, cause the computer to perform steps of:

displaying, in a user interface, a first frame, including a first document context navigational association which is the subject of a single navigational focus, the single navigational focus being controllable by a user that is viewing multiple contexts of electronic documents and defined as including a single set of navigational controls in a displayable pinned page object configured to control all contexts within a frame of a display;

displaying, in the user interface, a second frame, including a second document context simultaneously with the first document context while maintaining the single navigational focus associated with the first document context; and shifting the navigational focus by user selection to the second frame from the navigational association with the first document context to a navigational association with the second document context, the single set of navigational controls in the user interface configured to control the second document context in the second frame while maintaining control of the second document context within the displayable pinned page object configured to control all contexts, wherein at least one other document context navigational association is accessible by navigation from the first document context navigational association and at least one other document context is accessible by navigation from the second document context navigational association.

13. The computer-readable medium of claim 12, wherein the first and second document contexts are non-contiguous parts of the same electronic document.

14. The computer-readable medium of claim 12, wherein the first and second document contexts are parts of different electronic documents.

15. The computer-readable medium of claim 12, further comprising the step of receiving a page pinning signal input by a user, and wherein the step of displaying, in the user interface, a second frame, including the second document context occurs in response to the page pinning signal.

16. The computer-readable medium of claim 12, wherein the step of displaying, in the user interface, a second frame, including the second document context comprises displaying a document comprising at least one command in response to a command document display signal input by a user, the method further comprising the step of permitting the user to select a command from the at least one command in the document.

17. The computer-readable medium of claim 16, wherein the command document display signal automatically initiates a page pinning signal that results in the display of the first document context as a pinned page overlayed on the document comprising at least one command.

18. The computer-readable medium of claim 16, wherein the command document display signal automatically initiates a page pinning signal that results in the display of the document with at least one command as a pinned page overlayed on the first document context.

19. The computer-readable medium of claim 12, wherein the step of displaying, in the user interface, a second frame, including the second document context comprises displaying a page with an index, wherein the index is provided with at least one link, the method further comprising the step of pinning the page comprising an index and displaying a context corresponding to a link selected by the user from the index page.

20. The computer-readable medium of claim 12, wherein the step of displaying, in the user interface, a second frame, including the second document context comprises the step of displaying an index having at least one link and a corresponding context associated with each link.

21. The computer-readable medium of claim 20, further comprising the step of displaying a third document context in response to a user selecting a corresponding link.

22. The computer-readable medium of claim 12, wherein the step of displaying, in the user interface, a second frame, including the second document context further comprises the steps of:
    receiving a page pinning signal from a user; and
    in response to the page pinning signal, displaying a viewport to the first document context as a pinned page overlayed on the second document context.

23. In a computer system having a user interface, including a display and a selection device, a method to unify navigational control displaying multiple contexts of electronic documents comprising the steps of:
    displaying, in the user interface, a first frame, including a first document context navigational association which is the subject of a single navigational focus, the single navigational focus being controllable by a user that is viewing multiple contexts of electronic documents and defined as including a single set of navigational controls in a displayable pinned page object configured to control all contexts within a frame of the display;
    navigating a first document to a first document context within the navigational focus;
    receiving a page pinning signal relating to the displayable pinned page object;
    in response to the page pinning signal, the displayable pinned page object displays at least a portion of the first context as a pinned page overlayed on the first context while maintaining the single navigational focus associated with the first document context;
    displaying, in the user interface, a second frame, including a second document context within the single navigational focus associated with the first document context;
    navigating a second document while the pinned page remains displayed; and
    shifting the navigational focus by user selection to the second frame from the navigational association with the first document context to a navigational association with the second document context, the single set of navigational controls in the user interface configured to control the second document context in the second frame while maintaining control of the second document context within the displayable pinned page object configured to control all contexts.

24. The method of claim 23, wherein the first and second document contexts are non-contiguous parts of the same electronic document.

25. The method of claim 23, wherein the first and second document contexts are parts of different electronic documents.

26. The method of claim 23, wherein the step of receiving a page pinning signal further comprises receiving an input by a user selection device.

27. The method of claim 23, wherein the step of displaying, in the user interface, a second frame, including the second document context comprises the step of displaying the second document comprising at least one command in response to a command document display signal input by a user.

28. The method of claim 27, wherein the page pinning signal is initiated automatically in response to the input of the command document display signal.

29. The method of claim 28, further comprising the step of selecting a command from the second document comprising at least one command.

30. The method of claim 23, further comprising the step of selecting a region in the first document context in which a command is to be performed.

31. The method of claim 23, wherein the step of displaying, in the user interface, a second frame, including the second document context comprises the step of displaying a page comprising at least an index for permitting a user to navigate other documents.

32. The method of claim 31, wherein the index is provided with at least one link, the method further comprising the step of pinning the page with the index and displaying the first document context corresponding to a link selected by the user from the index.

33. The method of claim 23, wherein the step of displaying, in the user interface, a second frame, including the second document context comprises the step of displaying an index having at least one link and a corresponding context associated with each link.

34. The method of claim 33, further comprising the step of displaying a third document context in response to a user selecting a corresponding link.

* * * * *

UNITED STATES PATENT AND TRADEMARK OFFICE
CERTIFICATE OF CORRECTION

PATENT NO.         : 7,496,829 B2
APPLICATION NO.    : 10/940729
DATED              : February 24, 2009
INVENTOR(S)        : Darryl E. Rubin et al.

It is certified that error appears in the above-identified patent and that said Letters Patent is hereby corrected as shown below:

In column 18, line 25, in Claim 24, delete "arc" and insert -- are --, therefor.

Signed and Sealed this
Third Day of May, 2011

David J. Kappos
*Director of the United States Patent and Trademark Office*